United States Patent
Lin

(10) Patent No.: US 8,885,088 B2
(45) Date of Patent: Nov. 11, 2014

(54) FOCUS POSITION SEARCHING METHOD

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/892,351

(22) Filed: May 13, 2013

(65) Prior Publication Data

US 2013/0335620 A1  Dec. 19, 2013

(30) Foreign Application Priority Data

Jun. 19, 2012 (TW) .............................. 101121841 A

(51) Int. Cl.
H04N 5/232 (2006.01)
G03B 13/00 (2006.01)
G03B 13/36 (2006.01)
G02B 7/36 (2006.01)

(52) U.S. Cl.
CPC ............ *G03B 13/36* (2013.01); *H04N 5/23212* (2013.01); *G02B 7/36* (2013.01)
USPC ....................................................... 348/345

(58) Field of Classification Search
USPC ........................................ 348/345, 373–376
See application file for complete search history.

(56) References Cited

U.S. PATENT DOCUMENTS

| 2008/0124068 A1* | 5/2008 | Kwon et al. | 396/127 |
| 2010/0110270 A1* | 5/2010 | Sekimoto et al. | 348/340 |
| 2011/0058093 A1* | 3/2011 | Kim | 348/345 |
| 2011/0261248 A1* | 10/2011 | Matsuda | 348/340 |
| 2012/0063019 A1* | 3/2012 | Hsu et al. | 359/824 |
| 2012/0230666 A1* | 9/2012 | Li et al. | 396/135 |

* cited by examiner

*Primary Examiner* — Roberto Velez
*Assistant Examiner* — Tuan Le
(74) *Attorney, Agent, or Firm* — Novak Druce Connolly Bove + Quigg LLP

(57) ABSTRACT

A focus position searching method is used to determine an optimum position of a lens module, the lens module being driven by a voice coil motor (VCM), the VCM according to an input current to drive the lens module. The focus position searching method is used to search a left boundary and a right boundary, then two current values are obtained in a range between the left and the right boundaries, by using a golden section method to drive the lens module to capture an image and calculate sharpness of the image. According to the sharpness, the left and the right boundaries are continuously moved rightward and leftward, thereby two differences current values are obtained in the left and right boundaries within a certain range, and a searched current is used to carry out the focus.

4 Claims, 2 Drawing Sheets

FOCUS POSITION SEARCHING METHOD

BACKGROUND

1. Technical Field

The present disclosure relates to an auto-focus technologies, and particularly to an auto-focus method capable of finding a focused position.

2. Description of Related Art

In order to change a relative position between a lens module and a sensing element, a camera module uses an auto-focus function that uses a voice coil motor to drive the lens module, and focuses the lens module to get a sharp image. A commonly used image analytic function is a modulation transfer function (MTF). In order to improve searching for an optimum focus position, a larger searching space to calculate the MTF value one by one is used, and when the MTF value is over a peak value, a searching space is narrowed for recalculating the MTF value. The above steps are repeated until the peak value over the MTF value no longer changes, then the auto-focus function is completed. But when the MTF curve shows little oscillation, it is easy to search only in regional peaks, rather than a global peak. Therefore, it is necessary to provide a focus position searching method to avoid falling into a regional peak.

DETAILED DESCRIPTION

Embodiments will now be described in detail below with reference to the flowchart. In the present embodiment, providing a method for searching a focus position which is used in cameras, phones and other electronic devices to determine a position of a lens module, the lens module is driven by a voice coil motor (VCM). The VCM converts an input current into an impelling force for the lens module, where the input current corresponds to a displacement of the lens module. In other words, the lens module according to the input current moves to different positions, in order to obtain a sharp image.

Figure 1A:
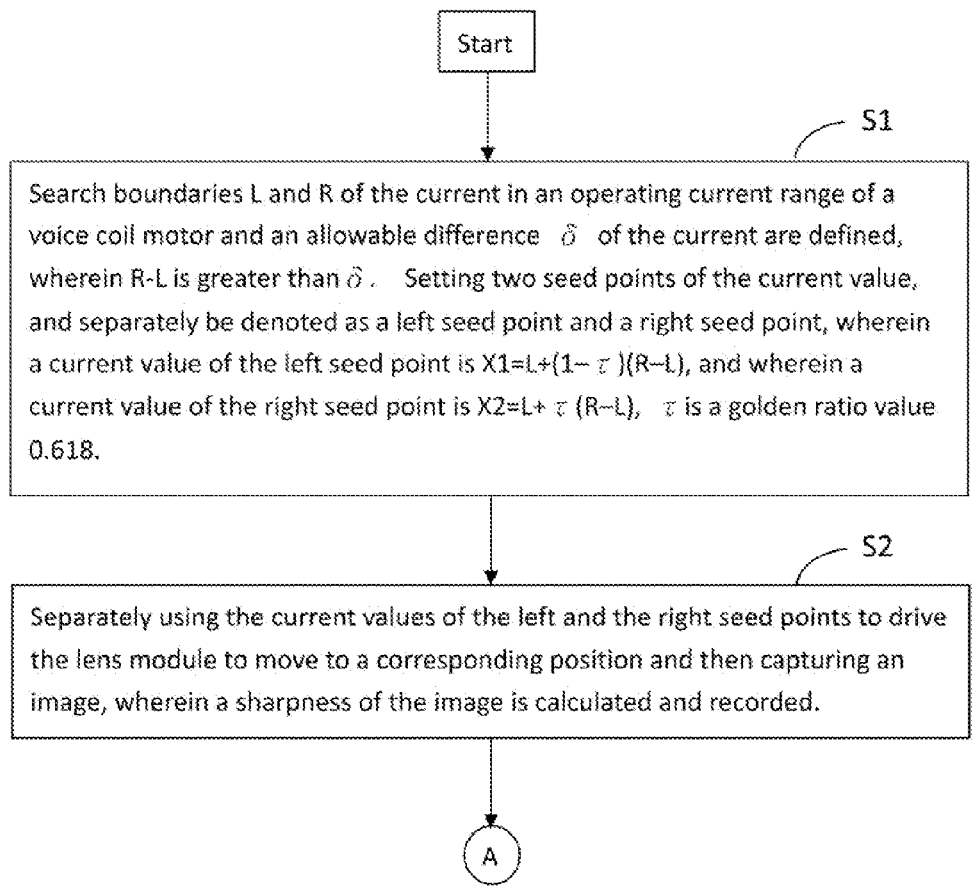
FIGS. 1A and 1B is a flowchart of a method for searching focus position in accordance with an exemplary embodiment.
Figure 1B:
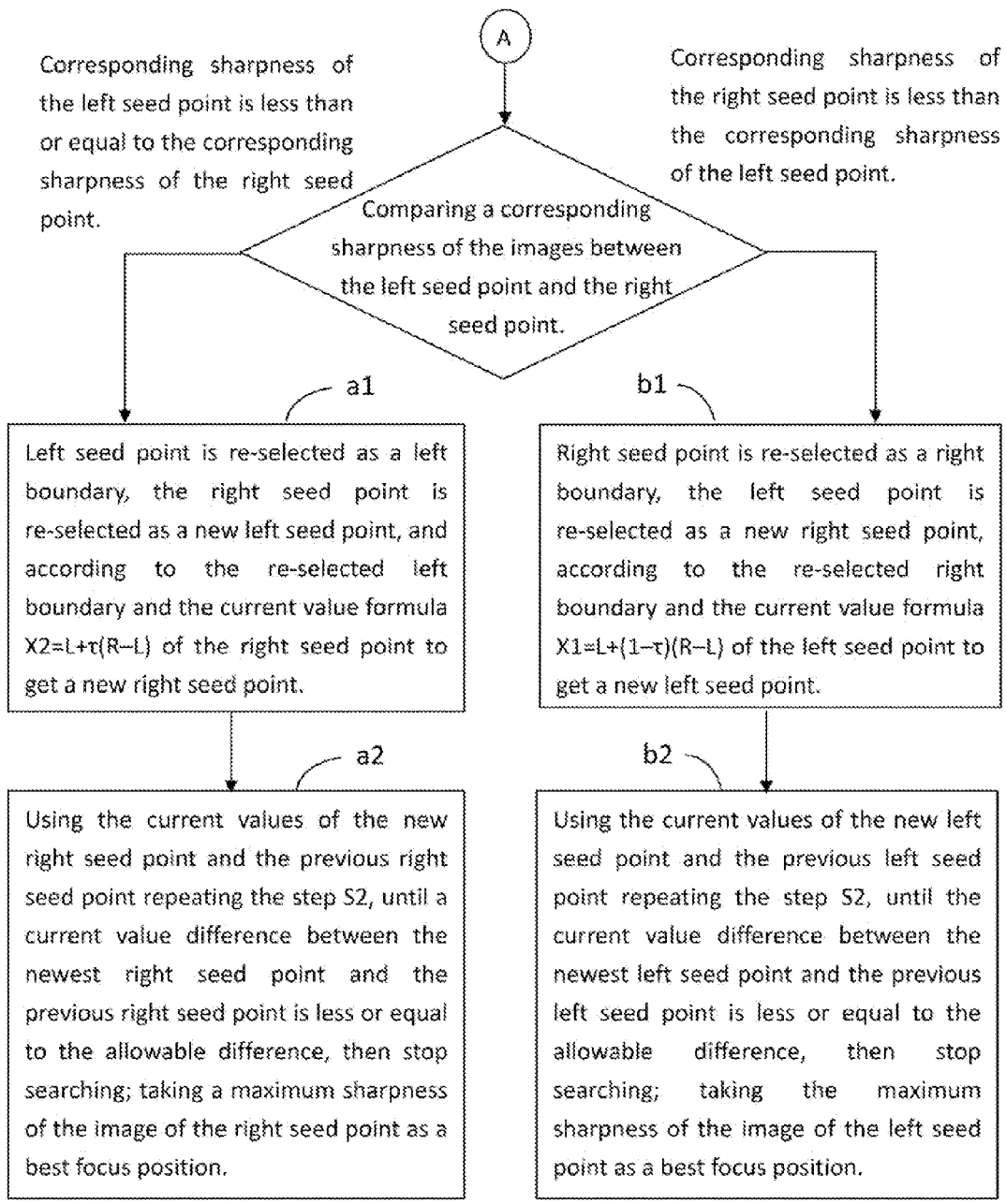

FIGS. 1A and 1B show a method for searching focus position as follows:

In step S1, a search boundary of the current in an operating current range of a voice coil motor and an allowable difference of the current are defined, where a left boundary is denoted as L, a right boundary is denoted as R, and the allowable difference is denoted as $\delta$, wherein R−L is greater than $\delta$. Setting two seed points of the current value between the left and the right boundaries, and separately denoted as a left seed point and a right seed point, where a current value of the left seed point is $X1=L+(1-\tau)(R-L)$, and a current value of the right seed point is $X2=L+\tau(R-L)$, $\tau$ is a golden ratio value 0.618. The left seed point is opposite to the right seed point. Both seed points left and right are close to the edge of corresponding boundaries. Second, the value of $\delta$ is less than or equal to 0.05, in the embodiment the value is less than or equal to 0.01, then setting the search boundary in an allowable input current range for the voice coil motor.

In step S2, separately using the current values of the left seed point and the right seed point to drive the lens module to move to a corresponding position and then capture an image by the lens module. A sharpness of the image is calculated and recorded, then a corresponding sharpness of the images are compared between the left seed point and the right seed point, according to relationship of compared sharpness result between the left and the right seed points, and if the corresponding sharpness of the left seed point is less than or equal to the corresponding sharpness of the right seed point, the left seed point is re-selected as a left boundary, the flow goes to a1; if the corresponding sharpness of the right seed point is less than the corresponding sharpness of the left seed point, the right seed point is re-selected as a right boundary, the flow goes to step b1. In the present embodiment, the sharpness of the image can be obtained by following formula MTF= (High−Low)/(High+Low), wherein High=Ave+0.6(Max− Ave), Low=Ave−0.6(Ave−Min), Ave is an average value of a gray scale, Max is a maximum value of the gray scale, Min is a minimum value of the gray scale.

In step a1, the right seed point is re-selected as a new left seed point, and according to the re-selected left boundary and the current value formula $X2=L+\tau(R-L)$ of the right seed point to get a new right seed point.

In step a2, using the current values of the new right seed point and the previous right seed point repeat the step S2, until a current value difference between the newest right seed point and the previous right seed point is less or equal to the allowable difference, then the search is stopped, the maximum sharpness of the image of the right seed point is taken as a best focus position.

In step b1, the left seed point is re-selected as a new right seed point. According to the re-selected right boundary and the current value formula $X1=L+(1-\tau)(R-L)$ of the left seed point to get a new left seed point.

In step b2, using the current values of the new left seed point and the previous left seed point repeat the step S2, until the current value difference between the newest left seed point and the previous left seed point is less or equal to the allowable difference, then the searching is stopped, the maximum sharpness of the image of the left seed point is taken as a best focus position.

Using the focus position searching method, to search a sharpness for a close-up of 10,000 times experiment can find a target value every time, and using less time to search, (only within a range of about 12 to 15 times), and a deviation with the target value is less than 0.05.

Using the focus position searching method, to search a sharpness for a close-up and 20% noise is added, in 10,000 times experiment, there are 9,885 times deviation within 0.1, and using less time to search, (only within a range of about 12 to 15 times).

The focus position searching method in the present embodiment, a golden section method and an iteration feature are used, the left and the right boundaries are continuously moving rightward and leftward and making the search boundaries be pinched until reaching expectation, searching results can be avoided falling into a regional peak.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A focus position searching method, used to determine an optimum position of a lens module, the lens module being driven by a voice coil motor (VCM), the VCM moving according to an input current to drive the lens module, the focus position searching method, comprising:

S1: preliminarily selecting a left boundary L, and a right boundary R of a current value in an operating current range of a voice coil motor, and default an allowable difference, wherein a difference value of preliminary selected the left and right boundaries is greater than the allowable difference; setting two seed points of the current value between the left boundary L and the right boundary R, and separately denoted as a left seed point and a right seed point, wherein a current value of the left seed point satisfies $X1=L+(1-\tau)(R-L)$, and wherein a current value of the right seed point satisfies $X2=L+\tau(R-L)$, and $\tau$ is a golden ratio value 0.618;

S2: separately using the current values of the left seed point and the right seed point to drive the lens module to move to a corresponding position and then capturing an image by the lens module, wherein a sharpness of the image is calculated; comparing a corresponding sharpness of the images between the left seed point and the right seed point, according to relationship of compared sharpness result between the left and right seed points, and if the corresponding sharpness of the left seed point is less than or equal to the corresponding sharpness of the right seed point, the left seed point is re-selected as a left boundary, goes to step a1; if the corresponding sharpness of the right seed point is less than the corresponding sharpness of the left seed point, the right seed point is re-selected as a right boundary, go to step b1;

a1: the right seed point is re-selected as a new left seed point, and according to the re-selected left boundary and the current value formula $X2=L+\tau(R-L)$ of the right seed point to get a new right seed point;

a2: using the current values of the new right seed point and the previous right seed point, repeating the step S2, until a current value difference between the newest right seed point and the previous right seed point is less or equal to the allowable difference, then stop searching; taking a maximum sharpness of the image of the right seed point as a best focus position;

b1: the left seed point is re-selected as a new right seed point, according to the re-selected right boundary and the current value formula $X1=L+(1-\tau)(R-L)$ of the left seed point to get a new left seed point;

b2: using the current values of the new left seed point and the previous left seed point, repeating the step S2, until the current value difference between the newest left seed point and the previous left seed point is less or equal to the allowable difference, then stop searching; taking the maximum sharpness of the image of the left seed point as a best focus position.

2. The focus position searching method as claimed in claim 1, wherein the allowable difference is less than or equal to 0.05.

3. The focus position searching method as claimed in claim 2, wherein the allowable difference is less than or equal to 0.01.

4. The focus position searching method as claimed in claim 1, wherein the sharpness of the image can be obtained by following formula MTF=(High−Low)/(High+Low), wherein, High=Ave+0.6(Max−Ave), Low=Ave−0.6(Ave−Min), Ave is an average value of a gray scale, Max is a maximum value of the gray scale, Min is a minimum value of the gray scale.

\* \* \* \* \*